(12) United States Patent
Greenfield

(10) Patent No.: US 11,420,418 B2
(45) Date of Patent: *Aug. 23, 2022

(54) METHODS AND APPARATUS FOR PRODUCING SCORED MEDIUMS, AND ARTICLES AND COMPOSITIONS RESULTING THERE FROM

(71) Applicant: SCORRBOARD, LLC, Renton, WA (US)

(72) Inventor: Giles Greenfield, Renton, WA (US)

(73) Assignee: Scorrboard LLC, Tukwila, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/677,960

(22) Filed: Aug. 15, 2017

(65) Prior Publication Data
US 2018/0015695 A1 Jan. 18, 2018

Related U.S. Application Data

(63) Continuation of application No. 14/855,353, filed on Sep. 15, 2015, which is a continuation of application No. PCT/US2014/030909, filed on Mar. 17, 2014.
(Continued)

(51) Int. Cl.
*B32B 3/28* (2006.01)
*B32B 29/00* (2006.01)
(Continued)

(52) U.S. Cl.
CPC ............... *B32B 7/12* (2013.01); *B32B 3/10* (2013.01); *B32B 3/266* (2013.01); *B32B 3/28* (2013.01);
(Continued)

(58) Field of Classification Search
CPC .. B32B 3/28; B32B 3/30; B32B 29/08; B32B 29/005; B32B 2250/26; B32B 3/10;
(Continued)

(56) References Cited

U.S. PATENT DOCUMENTS 479,999 A   8/1892  Thompson
762,033 A   6/1904  Ferres
(Continued)

FOREIGN PATENT DOCUMENTS

AU   2014232272   10/2015
AU   2014265869   10/2015
(Continued)

OTHER PUBLICATIONS

Translation of CN2841324. (Year: 2006).*
(Continued)

*Primary Examiner* — Catherine A. Simone
(74) *Attorney, Agent, or Firm* — FisherBroyles LLP; Kevin D. Jablonski

(57) ABSTRACT

Methods and apparatus for making scored mediums, particularly but not exclusively for use in the corrugated board arts, and articles of manufacture and compositions made there with and made there by. When at least one scored medium is used in a layered or laminated article, and particularly when selectively used as a liner member and/or fluted member in a corrugated board, whether as part of a corrugated board article of manufacture or a laminate with at least one other member, the article will possess mechanical qualities superior to those that would otherwise exist if a non-scored medium was/were used. To achieve these desired qualities, a major axis of the scores formed in the scored medium runs askew, and preferably perpendicular, to the direction of beam strength in any article or article intermediate to which the scored medium is to be associated.

17 Claims, 1 Drawing Sheet

Related U.S. Application Data

(60) Provisional application No. 61/802,009, filed on Mar. 15, 2013.

(51) Int. Cl.
  B32B 29/08 (2006.01)
  B32B 7/12 (2006.01)
  B32B 3/10 (2006.01)
  B32B 3/26 (2006.01)
  B32B 7/03 (2019.01)

(52) U.S. Cl.
  CPC .............. B32B 7/03 (2019.01); B32B 29/005 (2013.01); B32B 29/08 (2013.01); *B32B 2250/26* (2013.01)

(58) Field of Classification Search
  CPC ... B32B 3/266; B32B 7/03; B32B 7/12; B31F 1/08; B31F 1/10; B31F 1/32; B31B 1/25; Y10T 428/24455; Y10T 428/24463; Y10T 428/24537; Y10T 428/24694; Y10T 428/24711; Y10T 428/24727
  USPC ....... 428/131, 134, 136, 181, 182, 184, 186, 428/153, 154, 167
  See application file for complete search history.

(56) References Cited

U.S. PATENT DOCUMENTS

| | | |
|---|---|---|
| 1,504,218 A | 8/1924 | Crowell |
| 1,582,841 A | 4/1926 | Lorenz |
| 1,591,062 A | 7/1926 | Smith |
| 1,620,367 A | 3/1927 | Lion |
| 1,692,720 A | 11/1928 | Cannard |
| 1,863,973 A | 6/1932 | Ellis, Jr. |
| 1,924,873 A | 8/1933 | Moone |
| 2,054,867 A | 9/1936 | Rudin et al. |
| 2,089,898 A | 8/1937 | Kappler |
| RE20,970 E | 1/1939 | Rowe et al. |
| 2,359,314 A | 10/1944 | Klein et al. |
| 2,409,195 A | 10/1946 | Crawford |
| 2,474,381 A | 6/1949 | Bergstein |
| 2,485,020 A | 10/1949 | Staude |
| 2,503,874 A | 4/1950 | Ives |
| 2,547,880 A | 4/1951 | Meyer et al. |
| 2,576,278 A | 11/1951 | Bode |
| 2,651,448 A * | 9/1953 | Dusseault ............ B65D 5/5095 206/335 |
| 2,758,047 A | 8/1956 | Dowd |
| 2,900,673 A | 8/1959 | Brooksbank |
| 2,960,145 A | 11/1960 | Ruegenberg |
| 3,002,876 A | 10/1961 | Rosati |
| 3,011,602 A | 12/1961 | Ensrud et al. |
| 3,039,372 A | 6/1962 | Bombard |
| 3,122,300 A | 2/1964 | La Bombard |
| 3,156,599 A | 11/1964 | Keesee |
| 3,178,494 A | 4/1965 | Tisdale |
| 3,179,023 A | 4/1965 | Hoff |
| 3,290,205 A | 12/1966 | Goldstein et al. |
| 3,449,157 A | 6/1969 | Wandel |
| 3,526,566 A | 9/1970 | McIlvain, Jr. et al. |
| 3,529,516 A | 9/1970 | Dorsey et al. |
| 3,542,636 A | 11/1970 | Wandel |
| 3,735,674 A | 5/1973 | Haddock |
| 3,773,587 A | 11/1973 | Flewwelling |
| 4,034,135 A * | 7/1977 | Passmore .................. B32B 3/28 428/136 |
| 4,126,508 A | 11/1978 | Hoelzinger |
| 4,140,564 A | 2/1979 | Schrader |
| 4,179,253 A | 12/1979 | Lightfoot |
| 4,259,950 A | 4/1981 | Klippel |
| 4,268,555 A | 5/1981 | Kantz |
| 4,285,764 A | 8/1981 | Salvai |
| 4,437,850 A | 3/1984 | Ono |
| 4,437,851 A | 3/1984 | Salenbo |
| 4,541,895 A | 9/1985 | Albert |
| 4,544,597 A | 10/1985 | Peer, Jr. et al. |
| 4,618,391 A | 10/1986 | Torti et al. |
| 4,657,611 A | 4/1987 | Guins |
| 4,693,413 A | 9/1987 | McFarland et al. |
| 4,748,067 A | 5/1988 | Cline |
| 4,800,286 A | 1/1989 | Bears |
| 4,800,826 A | 1/1989 | Shiskin |
| 4,886,563 A | 12/1989 | Bennett et al. |
| 4,931,346 A | 6/1990 | Nogueras Dardina |
| 4,935,082 A | 6/1990 | Bennett et al. |
| 5,061,232 A | 10/1991 | Bloch et al. |
| 5,156,901 A | 10/1992 | Tanaka |
| 5,316,828 A | 5/1994 | Miller |
| 5,339,577 A * | 8/1994 | Snyder ..................... B32B 3/28 52/95 |
| 5,356,364 A | 10/1994 | Veith et al. |
| 5,419,796 A | 5/1995 | Miller |
| 5,508,083 A | 4/1996 | Chapman, Jr. |
| 5,537,936 A | 7/1996 | Cordrey |
| 5,581,353 A | 12/1996 | Taylor |
| 5,582,571 A | 12/1996 | Simpson et al. |
| 5,589,257 A | 12/1996 | Carriker et al. |
| 5,630,903 A | 5/1997 | Knorr et al. |
| 5,687,517 A | 11/1997 | Wiercinski et al. |
| 5,690,601 A | 11/1997 | Cummings et al. |
| 5,733,403 A | 3/1998 | Morley |
| 5,799,861 A | 9/1998 | Bonner et al. |
| 5,857,395 A | 1/1999 | Bohm et al. |
| 5,944,016 A | 8/1999 | Ferko, III |
| 6,002,876 A | 12/1999 | Davis et al. |
| 6,056,840 A | 5/2000 | Mills et al. |
| 6,139,938 A | 10/2000 | Lingle et al. |
| 6,143,113 A | 11/2000 | Berube |
| 6,153,037 A | 11/2000 | Kim et al. |
| 6,162,155 A | 12/2000 | Gordon et al. |
| 6,261,666 B1 | 7/2001 | Enderby et al. |
| D467,204 S | 12/2002 | Andresen |
| 6,508,751 B1 | 1/2003 | Weishew et al. |
| 6,800,052 B1 | 10/2004 | Abe |
| 6,836,331 B2 | 12/2004 | Reis et al. |
| 6,871,480 B1 | 3/2005 | Goodrich |
| 7,255,300 B2 | 8/2007 | Johnston |
| 7,413,629 B2 | 8/2008 | Fisher et al. |
| 7,909,954 B2 | 3/2011 | Johnston |
| 7,963,899 B2 | 6/2011 | Papsdorf et al. |
| 8,012,309 B2 | 9/2011 | Pare et al. |
| 8,771,579 B2 | 7/2014 | Kohler |
| 10,328,654 B2 | 6/2019 | Greenfield |
| 10,363,717 B2 | 7/2019 | Greenfield |
| 10,800,133 B2 | 10/2020 | Greenfield |
| 2001/0001410 A1 | 5/2001 | Ishibuchi et al. |
| 2003/0137667 A1 | 7/2003 | Reis et al. |
| 2004/0076798 A1 | 4/2004 | Larsson et al. |
| 2004/0089412 A1 | 5/2004 | Topolkaraev |
| 2004/0159693 A1 | 8/2004 | Adachi |
| 2004/0224828 A1 | 11/2004 | Nelles |
| 2005/0209075 A1 | 9/2005 | Kocherga et al. |
| 2006/0151655 A1 | 7/2006 | Johnston |
| 2006/0246261 A1 | 11/2006 | Kasabo et al. |
| 2007/0098887 A1 | 5/2007 | Kohler |
| 2008/0300825 A1 | 12/2008 | Ishibuchi et al. |
| 2009/0029840 A1 | 1/2009 | Chen |
| 2009/0117376 A1 | 5/2009 | Bloembergen et al. |
| 2010/0028611 A1 | 2/2010 | Adie |
| 2010/0080941 A1 | 4/2010 | McCarville et al. |
| 2010/0331160 A1 | 12/2010 | Kohler |
| 2011/0014433 A1 | 1/2011 | Trani et al. |
| 2011/0114712 A1 | 5/2011 | Malo et al. |
| 2011/0177298 A1 | 7/2011 | Gardiner |
| 2011/0226847 A1 | 9/2011 | Nakano |
| 2012/0205429 A1 | 8/2012 | Trani et al. |
| 2012/0226250 A1 | 9/2012 | Sato et al. |
| 2012/0276341 A1 | 11/2012 | Lake et al. |
| 2013/0139837 A1 | 6/2013 | Kaljura et al. |
| 2014/0044923 A1 | 2/2014 | Gelli |
| 2014/0141113 A1 | 5/2014 | Kohler |
| 2014/0166520 A1 | 6/2014 | Hoppe et al. |

(56) References Cited

U.S. PATENT DOCUMENTS

| | | | |
|---|---|---|---|
| 2015/0010734 A1 | 1/2015 | Van Berlo | |
| 2015/0114249 A1 | 4/2015 | Comorre | |
| 2015/0307755 A1 | 10/2015 | Krumm et al. | |
| 2015/0321461 A1 | 11/2015 | MacPherson et al. | |
| 2016/0271897 A1 | 9/2016 | Greenfield | |
| 2017/0157894 A9* | 6/2017 | Greenfield | B32B 7/12 |
| 2017/0274616 A1 | 9/2017 | Greenfield | |
| 2017/0282489 A1 | 10/2017 | Greenfield | |
| 2017/0305103 A1 | 10/2017 | Greenfield | |
| 2017/0341331 A1 | 11/2017 | Greenfield | |
| 2019/0232600 A1 | 8/2019 | Greenfield | |

FOREIGN PATENT DOCUMENTS

| | | | |
|---|---|---|---|
| AU | 2017252261 | | 12/2018 |
| CA | 955095 | A | 9/1974 |
| CA | 2907431 | | 9/2014 |
| CA | 2907392 | | 11/2014 |
| CL | 1997000270 | A | 10/1997 |
| CL | 2004000310 | A | 3/2005 |
| CL | 2012002694 | A | 3/2013 |
| CL | 2014000247 | | 1/2014 |
| CL | 56755 | | 3/2014 |
| CL | 2013002596 | A | 4/2014 |
| CL | 2014003401 | A | 4/2015 |
| CL | 2015002781 | | 9/2015 |
| CL | 2018002987 | A1 | 2/2019 |
| CL | 2018002988 | A1 | 2/2019 |
| CL | 2018002989 | A1 | 2/2019 |
| CL | 2018002990 | A1 | 2/2019 |
| CN | 1092355 | A | 9/1994 |
| CN | 1126457 | | 7/1996 |
| CN | 1148360 | A | 4/1997 |
| CN | 1150403 | A | 5/1997 |
| CN | 1469802 | A | 1/2004 |
| CN | 2806125 | Y | 8/2006 |
| CN | 2841324 | | 11/2006 |
| CN | 101259765 | A | 9/2008 |
| CN | 101772457 | A | 7/2010 |
| CN | 101952120 | | 1/2011 |
| CN | 102105300 | A | 6/2011 |
| CN | 102470624 | A | 5/2012 |
| CN | 202986283 | U | 6/2013 |
| CN | 104494211 | A | 4/2015 |
| CN | 104621710 | A | 5/2015 |
| CN | 105121147 | | 12/2015 |
| CN | 105121148 | | 12/2015 |
| EP | 1110709 | A2 | 6/2001 |
| EP | 2969522 | | 1/2016 |
| EP | 2969526 | | 1/2016 |
| EP | 3436649 | A1 | 2/2019 |
| EP | 3445583 | A4 | 2/2019 |
| EP | 3433426 | B1 | 9/2021 |
| FR | 2550724 | | 2/1985 |
| FR | 2596033 | A1 | 3/1986 |
| FR | 2594160 | A3 | 8/1987 |
| GB | 594328 | A | 11/1947 |
| GB | 977069 | A | 12/1961 |
| GB | 1542765 | A | 3/1979 |
| GB | 2144077 | A | 2/1985 |
| GB | 2258189 | A | 2/1993 |
| GB | 2301316 | A | 5/1995 |
| GB | 2368074 | A | 4/2002 |
| HK | 212302 | | 6/2016 |
| HK | 1212298 | | 6/2016 |
| JP | S4972089 | U | 7/1974 |
| JP | 50-10195 | U | 4/1975 |
| JP | S51-115191 | A | 10/1976 |
| JP | S52-156090 | A | 12/1977 |
| JP | 60-27529 | | 2/1985 |
| JP | 62-116133 | | 5/1987 |
| JP | H02-63358 | A | 3/1990 |
| JP | 02-235623 | A | 9/1990 |
| JP | H03-26534 | A | 2/1991 |
| JP | H03-106031 | | 11/1991 |
| JP | 03-275292 | A | 12/1991 |
| JP | 1996-309889 | | 11/1996 |
| JP | H09-39119 | A | 2/1997 |
| JP | H0948077 | A | 2/1997 |
| JP | H09158096 | A | 6/1997 |
| JP | H10-50775 | A | 2/1998 |
| JP | 2000202930 | A | 7/2000 |
| JP | 2003291230 | A | 6/2001 |
| JP | 2002103489 | A | 4/2002 |
| JP | 2005509545 | A | 4/2005 |
| JP | 2007152689 | A | 6/2007 |
| JP | 2009125998 | A | 6/2009 |
| JP | 2009172942 | A | 8/2009 |
| JP | 2011/079207 | A | 4/2011 |
| JP | 2011079207 | A | 4/2011 |
| JP | 2013049275 | A | 3/2013 |
| JP | 2013-523492 | | 6/2013 |
| JP | 2016-519008 | | 6/2016 |
| JP | 2016515959 | | 6/2016 |
| JP | 2019513580 | A | 5/2019 |
| JP | 2019514726 | A | 6/2019 |
| KR | 1019970007021 | | 2/1997 |
| KR | 10-1998-0069691 | | 10/1998 |
| KR | 2000-0058870 | | 10/2000 |
| KR | 2000/0058870 | A | 10/2000 |
| KR | 20002179300000 | | 1/2001 |
| KR | 1008/66390 | B1 | 11/2008 |
| KR | 100866390 | B1 | 11/2008 |
| KR | 20110104772 | A | 9/2011 |
| KR | 0160008170 | | 1/2016 |
| KR | 0160008518 | | 1/2016 |
| PH | 12015502380 | | 2/2016 |
| PH | 12015502381 | | 2/2016 |
| WO | 93/23241 | A1 | 11/1993 |
| WO | 9427813 | A1 | 12/1994 |
| WO | WO 95/35204 | A1 | 12/1995 |
| WO | 98/18614 | | 5/1998 |
| WO | 1999047347 | | 9/1999 |
| WO | 01/58679 | A1 | 8/2001 |
| WO | 2004052635 | A1 | 6/2004 |
| WO | 2009/101526 | A1 | 8/2009 |
| WO | WO 2009101526 | A1 * | 8/2009 | B31D 3/005 |
| WO | 2012128604 | | 9/2012 |
| WO | 2013019126 | A1 | 2/2013 |
| WO | WO 2013/098353 | A1 | 7/2013 |
| WO | 2014146036 | | 9/2014 |
| WO | 2014186043 | | 11/2014 |
| WO | WO 2015/128546 | A1 | 9/2015 |
| WO | 2015178766 | A1 | 11/2015 |
| WO | 2017184447 | A1 | 10/2017 |

OTHER PUBLICATIONS

Translation of KR100866390. (Year: 2008).*
First Examination Report for New Zealand Patent Application Serial No. 712616, New Zealand Intellectual Property Office, dated Nov. 30, 2015, pp. 2.
First Examination Report for New Zealand Patent Application Serial No. 712611, New Zealand Intellectual Property Office, dated Nov. 30, 2015, pp. 2.
International Search Report based on PCT/US2014/030916; dated Aug. 22, 2014, pp. 3.
International Search Report based on PCT/US2014/030909; dated Aug. 20, 2014, pp. 3.
First Patent Examination Report for Australian Patent Application Serial No. 2014232272, Australian Government, IP Australia, dated Mar. 3, 2016, pp. 3.
First Patent Examination Report for Australian Patent Application Serial No. 2014265869, Australian Government, IP Australia, dated Apr. 21, 2016, pp. 2.
Second Examination Report for New Zealand Patent Application Serial No. 712611, New Zealand Intellectual Property Office, dated Jul. 6, 2016, pp. 3.
International Search Report & Written Opinion dated Jun. 15, 2017; PCT Appl. No. US17/23611 filed Mar. 22, 2017.
International Search Report & WrittenOpinion dated Jun. 27, 2017; PCT Appl. No. US17/25510; filed Mar. 31, 2017.

(56) References Cited

OTHER PUBLICATIONS

International Search Report & Written Opinion dated Jun. 30, 2017; PCT Appl. No. US17/027624; filed Apr. 14, 2017.
Internation Search Report & Written Opinion, dated Jul. 21, 2017; PCT/US2017/025531, filed Mar. 31, 2017.
International Search Report and Written Opinion dated Jul. 6, 2017; PCT Appl. US2017/25491, filed Mar. 31, 2017.
WO dated Aug. 20, 2009 for PCT/IB2009/000271 filed Feb. 13, 2009.
European Extended Search Report; European Patent Organization; EP 14797031.3; dated Oct. 31, 2016; pp. 1-8.
Mikami et al.; "Analysis of normal compression strength of corrugated board sheet by the finite element method"; Journal of Packaging Science & Technology, Japan, vol. 13 No. 4, pp. 143-252.
European Patent Office; Extended European Search Report dated Jul. 15, 2019; EP Application No. 17771068.8; pp. 1-6.
European Patent Office; Extended European Search Report dated Jul. 11, 2019; EPO Application No. 17786383.4; pp. 1-7.
European Patent Office; Extended European Search Report dated Nov. 27, 2019; EPO Application No. 17786318.0; pp. 1-8.
European Patent Office; Extended European Search Report dated Nov. 28, 2019; EPO Application No. 17776824.9; pp. 1-7.
European Patent Office; Extended European Search Report dated Nov. 21, 2019; EPO Application No. 17786382.6; pp. 1-8.
European Patent Office; Extended European Search Report dated Nov. 21, 2019; EPO Application No. 17786312.2; pp. 1-7.
EMS Innovations Inc., "Adult Dispos-A-Board", published on Youtube.com on Mar. 2, 2012, retrieved from URL https://www.youtube.com/watch?v=Ses-wKU5ht4 on Apr. 29, 2020 (Year: 2012).
http://www.merriam-webster.com/dictionary/score (Year: 2021).
http:en.wikipedia.org/wiki/Paper_embossing (Year: 2021).
Brandtjen & Kluge, Inc.; "Embossing and Foil Stamping Techniques Made Easy"; pp. 1-14 (1986).

\* cited by examiner

METHODS AND APPARATUS FOR PRODUCING SCORED MEDIUMS, AND ARTICLES AND COMPOSITIONS RESULTING THERE FROM

PRIORITY CLAIM

The present application is a Continuation of U.S. patent application Ser. No. 14/855,353, filed Sep. 15, 2015; which application is a Continuation of International Patent Application Serial No. PCT/US2014/030909, entitled METHODS AND APPARATUS FOR PRODUCING SCORED MEDIUMS, AND ARTICLES AND COMPOSITIONS RESULTING THERE FROM, filed Mar. 17, 2014; which claims the benefit of U.S. Provisional Patent Application Ser. No. 61/802,009, filed Mar. 15, 2013; all of the foregoing applications are incorporated herein by reference in their entireties.

BACKGROUND

Corrugated board, also known as corrugated cardboard or colloquially as cardboard, represented a significant advancement in the container arts. Single wall corrugated board comprised a fluted paper medium bonded to and separating two flexible liners of paper to create an engineered article having exceptional stiffness or resistance to deflection in the in the strong axis or flute direction (i.e., parallel to the flutes) due to beam strength induced by the flutes, and good stiffness in the weak axis or orthogonal direction thereto (i.e., perpendicular to the flutes) due to one of the sheets resisting deflection through tensioned resistance between flute peaks and an opposing sheet resisting deflection through compressive resistance there between.

To increase resistance to deflection and/or increase flexural stiffness of single and/or multiple wall corrugated board in general, and particularly in the weak axis, one may increase the basis weight of the liners and or fluted medium; increase the flute pitch; modify the pulp characteristics of the material used for the liners and/or fluted medium; control fiber orientation in the materials used for the liners and/or fluted medium; and/or augment the liners and/or flute medium by coating or other structural modifications. Additionally, increased resistance to deflection and/or increased flexural stiffness can be achieved by creating multiple wall corrugated boards, e.g., double and triple wall boards, by layering single faced corrugated board.

A common theme to the aforementioned solutions for increasing resistance to deflection and/or increasing flexural stiffness of a single wall corrugated board is the requirement for modifying the constitution of the paper itself, i.e., material properties such as basis weight, fiber orientation or material composition, or modifying the flute configuration, i.e., flute frequency (pitch) or amplitude (caliper). In each instance, a change in the material constitution or article design must be made prior to formation of the corrugated board article, which may not be suitable for other applications. As a consequence, more stock materials must be stored for disparate purposes, production lines must be changed for different runs, etc.

Heretofore, corrugated board liners have been characterized as generally planar, the result of which has been single wall corrugate board having a generally smooth surface on both major sides thereof. If increased flexural stiffness was desired, a plethora of pre- and post formation manipulations have been employed: from the simple such as creating multiple faced corrugated board (e.g., double or triple faced board) to the more complex such as laminating multiple single wall corrugated board during article converting processes.

BRIEF DESCRIPTION OF DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

Figure 1:
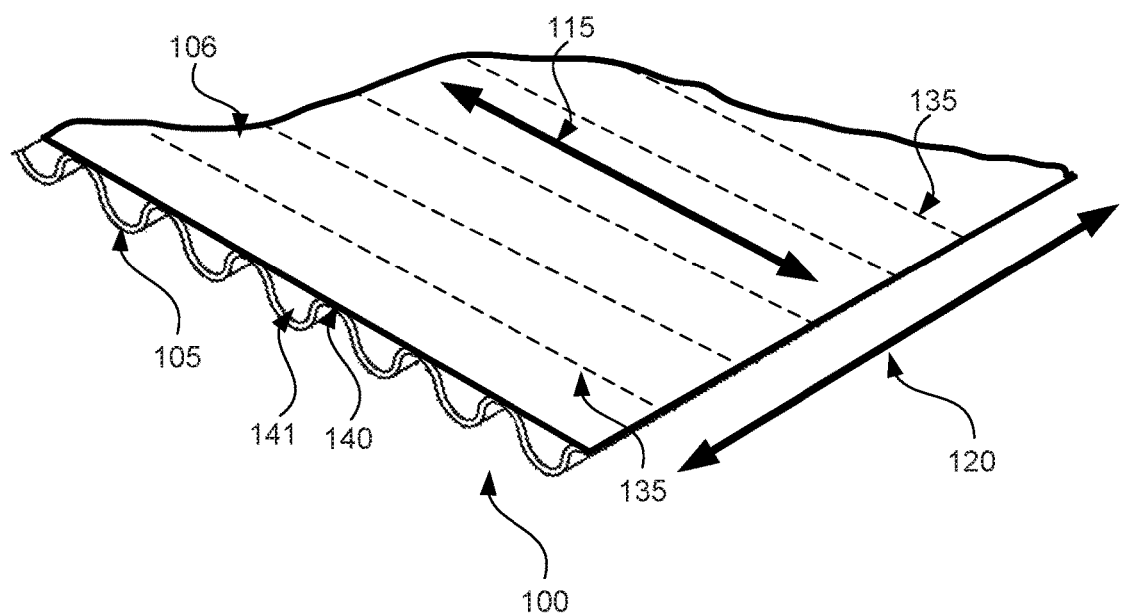
FIG. 1 is a diagram of a portion of resultant corrugated paper product that includes a liner portions and a fluted portion with incongruent major axes according to the subject matter disclosed herein.

The subject matter discussed herein is directed to methods and apparatus for making scored mediums, particularly, but not exclusively, for use in the corrugated board arts, and articles of manufacture and compositions made there with and made there by. FIG. 1 is a diagram of a portion of resultant corrugated paper product 100 that includes a liner medium 106 and a fluted medium 105 with incongruent major axes according to the subject matter disclosed herein. When at least one scored medium 106 is used in a layered or laminated article 100, and particularly when selectively used as a liner member and/or fluted member in a corrugated board, whether as part of a corrugated board article of manufacture or a laminate with at least one other member, the article will possess mechanical qualities superior to those that would otherwise exist if a non-scored medium was/were used. To achieve these desired qualities, a major axis 115 of the scores 135 formed in the scored medium 106 runs askew (incongruent), up to and including perpendicular, to the direction 120 of beam strength in any article or article intermediate to which the scored medium is to be associated (e.g., the major axis 120 of the fluted medium 105 in FIG. 1).

For example, the direction of beam strength of a fluted member 105 is parallel to its major axis 120 (the flute direction, i.e., the direction of a continuous peak 140 or valley 141). Similarly, the direction of beam strength of a scored liner 106 at a score is parallel to the score's major axis 115 (the score direction, i.e., the direction of a continuous peak or valley).

As a result of integration and/or substitution of scored mediums according to these various embodiments with or in, for example, corrugated boards, performance characteristics associated with conventionally derived corrugated boards can be achieved even while using lower basis weight materials (liners/fluted members), lower quality materials (higher recycled content), and/or decreased caliper. Moreover, in selected embodiments, preferential failure of embodiments serve to localize deformations, thereby increasing overall end article performance due to uniformity and predictability of converting actions and in-use load distributions.

As used herein, a "medium" refers to a flexible, yet deformable, substantially planar material, which includes two major surfaces and a longitudinal direction, of which a "sheet" is a subset thereof. The medium may be formed from cellulose, plastic(s) or combination thereof, and may be highly elongate in nature, e.g., a web. The medium is preferably intended for, but is not restricted to, use as an element, member or component in corrugated boards, laminated boards and combinations thereof.

The term "corrugated board" as used herein refers to single face, single wall or multiple wall engineered boards having at least one fluted element or component (an "element or component" is also referred to herein as a "member"), and at least one liner member attached thereto (the combination of a fluted member and a liner member is conventionally referred to as a single face corrugated board).

The term "laminated board" as used herein refers to engineered boards having at least two sheets at least partially adhered to each other in overlapping fashion. Laminated boards may be used alone or as a member in a corrugated board.

The term "score" as used in the singular sense herein refers to a type of surface feature characterized as an elongate, non-penetrating deformation formed in a medium wherein the deformation may be plastic, non-plastic or a combination thereof. Examples of plastic deformation include embossing, pressing and environmental modification (e.g., an elevated moisture and temperature environment); examples of non-plastic deformation include conventional roll forming (e.g., conventional scoring), bending, and folding. For many of the articles of manufacture and compositions comprising a scored medium that are disclosed herein, plastic deformation during score formation is preferred.

Referring back to FIG. 1, the non-penetrating deformation or score 135 is established in the medium 106 after its initial formation, i.e., not as part of the medium's innate formation process such as would be the case during an extrusion formation process. As will be discussed in greater detail below, establishing scores 135 after creation of the medium 106 provides exceptional economies and flexibility in creating articles of manufacture and compositions comprising a scored medium such as a liner member for corrugated boards.

Once established, the score 135 is preferably permanent, meaning that evidence of the score 135 will remain at least until, and preferably after, integration with other article elements—if the scored medium 106 is a liner member, then substantially all scores 135 exist after its attachment to a fluted member 105. Additionally, each score 135 defines a major axis 115 corresponding to its primary direction of elongation, and may define a greater than nominal minor axis.

Scored mediums 106 comprise a plurality of spaced apart scores 135 wherein the major axes 115 of at least some of the scores are preferably characterized as generally parallel to one another.

Depending upon the embodiment, each score 135 will have certain score attributes, namely, a cross sectional profile, a directional orientation relative to the medium, and a major axis quality, which includes a continuity quality. Each of these attributes, both singularly and in combination, affect the mechanical qualities of the medium 106 and/or articles and compositions (such as board 100) that include the medium. As will be described in more detail below, certain attributes may have substantial effects with regard to the resulting articles and compositions.

Figure 2A:
FIGS. 2A-2C show various embodiments of scores with respect to different cross-sectional score profiles according to various embodiments of the subject matter disclosed herein.
Figure 2B:
Figure 2C:

FIGS. 2A-2C show various embodiments of scores with respect to different cross-sectional score profiles according to various embodiments of the subject matter disclosed herein. With respect to a cross sectional profile of a score 135, three principal types exist, namely, rectilinear (e.g., 'V' or "I_I") (FIG. 2A), curvilinear (e.g., semicircular) (FIG. 2B) and hybrid (e.g., "U") (FIG. 2C). Each of these profiles in turn has a directional orientation relative to the medium, i.e., positive (a protrusion or land) or negative (a recess or groove) when viewed from one side thereof. Because a land on one side of the medium usually constitutes a groove on the other, the nomenclature is inherently indefinite unless only one side of the medium is being considered. Therefore, when describing the directional orientation of score profiles, it is necessary to maintain reference to a single side of the medium.

The major axis 115 quality of a score considers the score's characteristics along its run length. Such characteristics include planar orientation, i.e., directional orientation relative to the medium's major axis (e.g., parallel or non-parallel), and/or deviation(s) from the score's nominal major axis (e.g., sinusoidal, square or sawtooth geometry); and consistency or variability of score depth along its run length relative to the adjacent surface of the un-scored medium. The score depth may have constant or variable caliper and may include no depth, thereby creating non-scored portions or a segmented score. If in segmented form, the major axis quality of this characteristic may be characterized as patterned or random in segment length and/or pitch. As a corollary, a score need not extend a majority of a medium, although in many embodiment applications it does.

Depending upon the embodiment, a plurality of scores will have certain group qualities or attributes that may be characterized in certain ways. With respect to score attributes, two adjacent scores having identical score attributes will be considered homogeneous scores; a plurality of adjacent scores having identical score attributes will be considered a homogeneous group of scores. The converse is then also true: two adjacent scores having non-identical score attributes will be considered heterogeneous scores; a plurality of adjacent scores having non-identical score attributes will be considered a heterogeneous group of scores (although a subset of scores within the plurality may have identical score attributes and therefore the subset would be considered homogeneous scores).

With respect to score pitch, a plurality of adjacent scores having identical lateral spacing, preferably over each score's run length, will be considered to have a constant score pitch while a plurality of adjacent scores having non-identical lateral spacing will be considered to have a variable score pitch (although a subset of scores within such plurality may have constant spacing and therefore the subset would have a constant score pitch).

The foregoing definitions presumed that the scores within a plurality were parallel to one another. However, such a geometric relationship is not necessary in order to fall within the scope of the subject matter disclosed herein. In such instances, the relative score pitch is variable along the run length of adjacent score, and is referenced herein as a skewed score pitch. Again, the degree of relative convergence/divergence over a run length may be constant between adjacent scores or may be variable.

Corrugated article embodiments (such as shown in FIG. 1) comprise at least one scored member 106 in combination with its counterpart member 105. In other words, if the scored member 106 is a liner member, then the counterpart member 105 is a fluted member. If the scored member is a fluted member, then the counterpart member is a liner member. In this basic form, the article is considered a single face corrugated board. When an additional liner member is attached to the fluted member, the resulting article is considered a scored single wall corrugated board. Corrugated article embodiments also include single wall corrugated board comprising two scored liner members, with or without incorporation of a scored fluted member. By extension, double wall corrugated boards can comprise one, two or three scored liner members (with or without incorporation of one or two scored fluted members), and triple wall corrugated board can comprise one, two, three or four scored liner members (with or without incorporation of one, two or three scored fluted members).

Turning first to scored liner member embodiments, for maximum performance (e.g., stiffness) the overall score run direction/axes 115 of a scored liner member 106 is established perpendicular to the fluted member axis 120, thereby creating beam strength in the liner member 106 that is parallel to the fluted member's weak axis. While the directional orientation of liner member scores 135 can be positive and/or negative in reference to the exposed or outer (non-fluted) side of a single face corrugated board, the scores are preferably characterized as negative. In this manner, positive surface features extend towards and into the peaks 140 of the fluted member 105. Since the exposed or outer side of the liner member only has negative surface features, the caliper of corrugated boards comprising such scored liner member(s) remains unaffected by the inclusion thereof. Moreover, when viewed from the inner surface of the liner member, the positive surface features presenting to the peaks 140 of the fluted member 105 function to mechanically interact therewith, which when combined with the use of adhesive increases the strength of the bond there between.

Alternatively, if the directional orientation of the scores 135 in the liner member 106 are reversed, a glue pocket may be created at the interface between the flute peak of the fluted member and the negative features of the liner member's inner surface. If glue is applied to the liner member 106 as opposed to the flute peaks 140, the inner surface negative features may receive additional glue and thereby enhanced structural properties after its cure. In addition, because the scored liner member 106 in such embodiments will have positive surface features present on the outer surface thereof, the coefficient of friction for such liner member will be altered, which may have functional benefits in certain applications.

Finally, a scored liner member 106 can have a heterogeneous mix of score orientations, thereby potentially realizing benefits of both orientations described above. In such embodiments, at least some of the scores 135 have a directional orientation substantially opposite to that of at least some other scores. The mix may present a pseudo-sinusoidal pattern (i.e., adjacent scores have opposite orientations), grouped patterns of orientations and/or random orientations.

Corrugated boards comprising a scored medium also include embodiments wherein the fluted member comprises a plurality of scores. As was the case with scored liner member embodiments, the overall score run direction/axes is established perpendicular to the fluted member major axis, thereby creating beam strength in the fluted member that is parallel to the fluted member's weak axis. It should be appreciated that the minor axis width of such scores as well as their pitch will likely be larger and greater than of those for liner members. Although this preferred difference results from optimizing the formation of the fluted member, it is not necessary to the functioning of various embodiments.

Because scored liner members 106 may be used for enhancing structural properties of single face corrugated boards 100, many embodiments will comprise a liner member 106 having a plurality of constant pitch, homogeneous linear scores 135 formed therein, wherein several factors are considered when determining the nature of the scored liner member 106, namely, score amplitude (i.e., relief or caliper), score pitch and score displacement. Preferably, these factors are also considered in light of the nature of the fluted member 105 that forms part of the ultimate corrugated board 100.

The parameters of score amplitude and pitch for any liner member 106 depend upon a variety factors, which are highly application dependent.

Nevertheless, amplitude and pitch considerations include, but are not limited to, the amount of lateral take-up, the liner member basis weight or caliper, and the corrugating environment if the scored liner member forms one part of a single face corrugated board or similar board.

In addition to score amplitude and pitch, score displacement relative to the major axis 120 of the flutes formed in the fluted member 105 is another important factor when discussing corrugated boards comprising at least one scored liner 106. Score displacement considers the relative angle between the predominant score major axis 115 or run direction of the scored liner member 106 and the flute direction 120 (or, in the non-corrugated arts, the predominant score major axis of a second scored sheet). Generally speaking, the score displacement will be 90° relative to the flute direction 120 for maximum resistance to weak axis bending of the fluted member. However, there may be instances wherein predictable localization of stresses is more desired than maximum stiffness and resistance to shear. Thus, score displacement need not be 90° in order to be within the scope herein.

It should be again understood that the scoring methods and resulting liner members disclosed herein can be used when forming any corrugated board, and need not nor should be limited to "first face" applications to form single face corrugated boards. Consequently, conventionally formed single face corrugated board can be used in conjunction with a scored second liner member to form a single wall corrugated board. Additionally, single face corrugated board comprising a scored liner member can be combined with another scored liner member to form a single wall corrugated board with two scored liner members. Moreover, a scored fluted member can be used in conjunction with any of the foregoing combinations. Thus, the scope herein extends to any medium making up part of a corrugated board.

The term "flutes" as used herein refers to a manipulation (as opposed to a modification) of a medium to transform it from a generally planar geometry to a generally sinusoidal geometry, which may have constant pitch, i.e., period, and conventionally forms one part of a single face corrugated board.

As noted previously, scored mediums need not be used as a liner member in conjunction with a fluted member, whether scored or not—at least one scored medium can be associated with one or a plurality of non-scored members. However, optimal performance can be achieved when pairs of orthogonally oriented scored members are used in a laminated article of manufacture, or when a plurality of scored members are so used and the net score major axis is minimal or zero (for example, a 3×120° displacement; a 5×72° displacement; a 6×60° displacement; etc.). Although a corrugated fluted member is not used, many, if not most, of the same characterizations apply as did with respect to embodiments comprising a corrugated fluted member. Moreover, in many respects, a scored member can be considered to have analogous performance qualities to that of a corrugated fluted member.

By extension, certain articles of manufacture incorporating the embodiments discussed above comprise corrugated board having (a) laminated face(s) comprising at least one scored liner member in combination with one of a non-scored liner member or another scored liner member. These hybrid corrugated boards therefore have one or more liner members having enhanced caliper, and preferably, enhanced stiffness due to the presence of at least one scored liner member.

While a web of scored medium may be created at the time of its manufacture, enhanced benefit can be realized through on-site formation of scored mediums from generic webs of the medium to meet the requirements of any given production run. By so doing, storage and setup of dedicated webs of scored mediums are thereby eliminated. In addition, roll density (run length) is greater for non-scored mediums than for scored mediums. Moreover, unintentional crushing of the surface features that characterize the scores is avoided if it is created just prior to incorporation with, for example, a fluted member.

Another advantage to concurrent score formation and corrugation occurs due to the environment in which the single face corrugating process takes place. To properly condition the medium that ultimately forms the fluted member, the medium is exposed to elevated temperature and humidity in this environment. These conditions permit the medium to more easily conform to the corrugating rollers and retain the sinusoidal shape after release there from. Similarly, by exposing the medium that ultimately forms the single face liner member to such an environment prior to scoring, the medium will be more compliant and the impressed scores will better retain their shape during subsequent handling and processing. Similarly, creation of scores in the material that ultimately becomes the fluted member will be concurrent with the corrugation process, again benefiting from the elevated temperature and humidity environment in this preferred environment.

The container arts frequently manipulate single, double and triple wall corrugated board into variously shaped containers. This manipulation requires converting the planar corrugated board (i.e., blank) into multiple sided containers or boxes. The converting process relies upon, inter alia, establishing scores that serve to localize a crease that results when forming container edges/corners through bending or folding of the corrugated board. The resulting crease is the manifestation of an intentional failure of the corrugated board: compression of the putative inner liner of the container or box is biased at or towards the score. As those persons skilled in the art appreciate, there is balance between creating a sufficiently effective score (high relief) and not breaching or penetrating the scored liner. Too little compression by a scoring wheel and the score's effectiveness is marginalized; too much compression by the scoring wheel and the liner can be penetrated, thereby materially weakening the resulting edge or corner joint.

Because integrated scored liner members enhance the stiffness of a corrugated board article by creating beam strength in the scored liner preferably in opposition to the weak axis of the board, it follows that mechanically destroying the structure associated with the induced beam strength will localize stresses imparted upon the board at or proximate to such locations.

In many corrugated board embodiments, the predominant major axes of the scores (run length) in at least one scored liner member are oriented perpendicular (or at least incongruent) to the fluted member major axis, as has been previously described. Because blank scoring predominately occurs parallel to the fluted member major axis (which is perpendicular to its weak axis), such blank scores will necessary run perpendicular to the liner member score run lengths (major axes).

Consequently, any re-scoring of the scored liner member (particularly, but not exclusively, on the positive surface feature side of the liner member) will compromise the integrity of the liner member scores, thereby directing stress induced failures (such as resulting from compressive converting actions) to the locations where the re-scoring has occurred. In this manner and particularly with respect to the re-scoring of positive feature side scores, it is only necessary to defeat the initial scoring rather than to mechanically deform the base liner member and/or fluted member through relatively high compression scoring in order to facilitate formation of a corrugated board fold/corner. An additional advantage of this ability is realized through the use of lower basis weight inner liners: since it is only necessary to defeat the scoring that results in beam formation, which itself was a result of material deformation, less consideration need be given to concerns regarding over-compression and medium penetration.

As touched upon above and to enhance the likelihood of failure in such instances and minimize unintended destruction of the scored liner in one series of embodiments, a scored liner of a blank, which forms an inner surface of a corner or fold, comprises positive surface feature scores on the exposed side of a corrugated board blank inner surface (the side opposite the fluted member). By so doing, when such inner liner member is subjected to compressive force through rescoring, the previous score-induced beams are intentionally destroyed, beneficially with minimal mechanical consequences to the virgin (non-previously scored) portions of the inner liner member. While the foregoing embodiments are presently described, in another series of embodiments the scored inner liner member presents its positive surface features to the fluted member side of the corrugated board blank. While greater scoring pressure is needed in such embodiments, certain advantages over the first series embodiments exist. In both series of embodiments, the subsequent re-scoring biases compressive failure of the inner liner member towards the outer liner member, thereby increasing the density of material within the fold/joint structure during the bending process, however, in the second series of embodiments, the reliability of such directional failure is considered more robust.

It should be noted that blank scoring may be optional during the blank converting process. In situations wherein the scored liner member of a corrugated board (for simplification, a single wall board is presumed) forms an inner surface of the converted form, simple bending of the board induces a compression load to all scores at the common axis of the hinge moment, which results in the scores generally uniformly failing at their mid points between flute peaks; these points are the most susceptible to compression failure. The resulting uniform "failure" of the scores at this common location along a fluted member, which corresponds to a flute valley, permits the inner liner member to displace into the valley, thereby creating a clean bend or fold or edge. Moreover, because the valley corresponds to a peak on the opposite side of the corrugated board, there is only minimal or nominal tension induced into the outer liner member at the bend/fold/edge location. As a consequence of this optimal arrangement, the inner surface of the bend/fold/edge remains clean and consistent along the length of the flute valley while the outer surface thereof retains most if not all original structural integrity. This optimization also permits a materially higher article reuse value: the hinge created by this arrangement is much less susceptible to material degradation over many cycles. And while an inner side scored liner member is preferred, similar functionality can also be achieved through use of an outer side scored liner member, although the results may not be as consistent or optimized.

For purposes of this patent, the terms "area", "boundary", "part", "portion", "surface", "zone", and their synonyms, equivalents and plural forms, as may be used herein and by way of example, are intended to provide descriptive references or landmarks with respect to the article and/or process being described. These and similar or equivalent terms are not intended, nor should be inferred, to delimit or define per se elements of the referenced article and/or process, unless specifically stated as such or facially clear from the several drawings and/or the context in which the term(s) is/are used.

What is claimed is:

1. A corrugated or laminated board, comprising:
   a first cellulose medium exhibiting a major direction of beam strength, the first medium formed in a plane having a plurality of continuous scores in the plane, each score having a major axis direction aligned substantially parallel to the major direction of beam strength of the first medium and a score pitch, each score comprising a plastic deformation in the first cellulose medium;
   a second cellulose medium affixed to the first medium, the second medium having a plurality of continuous flutes, each flute having a major axis direction and a flute pitch and formed parallel to the plane free from any plastic deformation; and
   wherein the major axis direction of the scores of the first medium are perpendicular with respect to the major axis direction of the flutes of the second medium; and
   wherein at least some of the scores have a raised protrusion away from the plane and away from the affixed second medium.

2. The board of claim 1, wherein a plurality of the scores of the first medium are linear.

3. The board of claim 1, wherein a plurality of the scores of the first medium are rectilinear.

4. The board of claim 1, wherein a plurality of the scores of the first medium are curvilinear.

5. The board of claim 1, wherein at least some of the scores of the first medium extend towards the second medium when the two mediums are affixed to each other.

6. The board of claim 1, wherein at least some of the scores of the first medium extend away from the second medium when the two mediums are affixed to each other.

7. The board of claim 1, wherein the major axis quality of at least some of the scores of the first medium are characterized as having a generally constant caliper.

8. The board of claim 1, wherein the major axis quality of at least some of the scores of the first medium are characterized as having a generally variable caliper.

9. The board of claim 1, wherein at least some of the scores of the first medium have a constant pitch.

10. The board of claim 1, wherein at least some of the scores of the first medium have a variable pitch.

11. The board of claim 1, wherein at least some of the scores of the first medium have a skewed pitch.

12. The board of claim 1, wherein at least some of the scores of the first medium are substantially homogeneous when compared to other first medium scores.

13. The board of claim 1, wherein at least some of the scores of the first medium are substantially heterogeneous when compared to other first medium scores.

14. The board of claim 1, further comprising a third medium that includes a plurality of scores having a major axis direction and a score pitch.

15. The board of claim 14, wherein the major axis of the scores of the first medium are congruent with the major axis of the scores of the third medium.

16. The board of claim 1, wherein the plurality of continuous scores in the plane are equally spaced apart with respect one another.

17. A corrugated board, comprising:
   a first cellulose medium having a major direction of beam strength formed in a plane having a plurality of continuous scores in the plane, each score having a major axis direction aligned substantially parallel to the major direction of beam strength of the first medium, each score in the plurality of scores comprising a plastic deformation that protrudes beyond the plane;
   a second cellulose medium having a major direction of beam strength and affixed to the first medium, the second medium having a plurality of continuous flutes, each flute having a major axis direction aligned with the major direction of beam strength of the second medium and formed parallel to the plane free from any plastic deformation; and
   wherein the major axis direction of the scores of the first medium are perpendicular with respect to the major axis direction of the flutes of the second medium and protrude away from the second cellulose medium.

* * * * *